(12) United States Patent
Warner

(10) Patent No.: US 10,422,045 B1
(45) Date of Patent: Sep. 24, 2019

(54) STEEL PLATE ALKALI ELECTROLYZER

(71) Applicant: Stanley Wesley Warner, Idaho Falls, ID (US)

(72) Inventor: Stanley Wesley Warner, Idaho Falls, ID (US)

( * ) Notice: Subject to any disclaimer, the term of this patent is extended or adjusted under 35 U.S.C. 154(b) by 0 days.

(21) Appl. No.: 15/364,450

(22) Filed: Nov. 30, 2016

(51) Int. Cl.
 C25D 17/02 (2006.01)
 C25D 17/08 (2006.01)
 C25B 1/04 (2006.01)
 C25B 15/02 (2006.01)
 C25B 9/06 (2006.01)
 F02M 27/04 (2006.01)

(52) U.S. Cl.
 CPC ............. C25B 1/04 (2013.01); C25B 9/06 (2013.01); C25B 15/02 (2013.01); F02M 27/04 (2013.01)

(58) Field of Classification Search
 CPC .. C25B 1/04; C25B 9/06; C25D 17/12; C25D 17/02; C25D 17/002; C25D 17/08
 USPC ........................................................ 204/242
 See application file for complete search history.

(56) References Cited

U.S. PATENT DOCUMENTS

| | | | |
|---|---|---|---|
| 2004/0074781 A1* | 4/2004 | Klein | C25B 9/06 |
| | | | 205/628 |
| 2010/0089676 A1* | 4/2010 | Papachristopoulos | C25B 1/04 |
| | | | 180/69.4 |

OTHER PUBLICATIONS

Wu et al. "Experimental Investigation of Producing Brown's Gas using a Metal-Plate Electrolyzer for Diesel Vehicle Applications" URL: https://onlinelibrary.wiley.com/doi/pdf/10.1002/ente.201600222, published Aug. 12, 2016.

Youtube "How Hydrogen Injection System Works in Diesel Engines" Accessed Jan. 25, 2019, URL: https://www.youtube.com/watch?v=4-55oEPU0eM.

* cited by examiner

Primary Examiner — Zulmariam Mendez

(74) Attorney, Agent, or Firm — Workman Nydegger

(57) ABSTRACT

An improved steel plate alkali electrolyzer uses an anode steel plate, by-polar steel plates, and a cathode steel plate (the number of bi-polar plated is determined by the voltage applied, the formula explained in Claim). The steel plate edges are wrapped with an insulating material to hold them in precise alignment. This unit is housed in a containment vessel, with the anode and cathode steel plates extending past the outside of the containment vessel to make electrical connections outside of liquid filled vessel. Shape and arrangement of the plates enables the gas production to create a circulating electrolyte (without the use of a pump) that produces a cooler operating and more efficient production of Brown's gas per watt, and less expensive to construction than any other known electrolyzer. Design is scalable allowing for a wide range of gas production and applications.

1 Claim, 3 Drawing Sheets

STEEL PLATE ALKALI ELECTROLYZER

(1) BACKGROUND OF THE INVENTION

This invention teaches a significant advancement in Brown's gas production efficiency increase above the current production efficiently levels of the present art of steel plate alkali electrolyzers. This new efficiency in this steel plate alkali electrolyzer will have a profound effect on the following—The benefit of infusing Brown's gas in internal combustion engines, especially diesels, is well known. Lesser known is the fact that particulate matter (PM) poisoning from diesel engines, just in California, is the cause of death of about 10 people per day. The infusion of Brown's gas into diesel engines can drastically reduce the PM that that causes those 10 fatalities per day in California alone. It is also well known that present electrolyzers are too inefficient to be used for on-board production for internal combustion engines (the presently available electrolyzers use too much electricity to generate the needed amounts of Brown's gas to cause a significant reduction in diesel PM and increase mpg), and as a possible alternative to on-board production, Brown's gas is far too dangerous to be compressed and then later infuse into the diesel engines to reduce PM and to increase mpg. Further, electrolyzers that produce hydrogen for use by hydrogen fuel cell vehicle are extremely expensive to build (The State of California is spending over $2,000,000.00 per, point of use hydrogen electrolyzers, for hydrogen fueling station) and the efficiency levels of the electrolyzers used requires the hydrogen to be sold at a rate of about $10.00 per kg. This hydrogen construction and production inefficiency is a considerable obstacle to the use of presently available hydrogen fuel cell vehicles. All of these problems will be defeated by the improved steel plate alkali electrolyzer that is the subject of this patent.

(2) BRIEF SUMMARY OF THE INVENTION

This improved steel plate alkali electrolyzer comprises steel plates wrapped by an insulating material holding the plates in precise spacing without the use of gaskets. The plates and the insulating material are surrounded by a containment vessel that is filled with electrolyte. The plates are designed so that the anode and cathode plates are longer that the other bi-polar plates and extend outside of the containment vessel so there is no electrical connection inside the containment vessel. The number of steel plates used is determined by formula to most efficiently affect the electrolysis process. The shape of the plates leads to more efficient electrolysis by not having holes in the area of the plates that produce electrolysis that would allow the electricity to pass through the holes and not create hydrogen, along with having an insulating material hold the plates in precise alignment and not allowing electricity to move around the edges of the plates but force the electricity to pass through the plates creating more Brown's gas. The shape of the plates also adds to the circulating of the electrolyte. The circulation of the electrolyte is caused by the warmer electrolyte rising in the electrolyzer and the bubbles from the Brown's gas adding to the speed and volume of that process. The warmer electrolyte and the Brown's gas bubbles exit the containment vessel at the top of the containment vessel. The Brown's gas goes to the point of use and the electrolyte is cooled by being outside of the containment vessel and then the cooler electrolyte reenters the containment vessel at the bottom further keeping the electrolyte and plates cooler and more efficient in the production of Brown's gas, than they would otherwise be without the recirculating liquid. This recirculation is accomplished without a pump or other mechanical means. This efficient and inexpensive design is scalable and exceeds in efficiency all other known electrolyzer designs for on-board production for internal combustions engines and for hydrogen production for hydrogen fuel cell vehicles.

The present art of a steel plate alkali electrolyzer is that they are too inefficient for on-board production of Brown's gas for internal combustion engines to significantly affect PM reduction and fuel efficiency.

The design of this improved steel plate alkali electrolyzer is less complicated and less expensive to construct than other electrolyzers. This advantage is further added to the fact that this design is scalable, it can be produced to create small, mid-range or large amounts of Brown's gas. This is a great advantage allows for the great efficiency of this unit to fit several Brown's gas and hydrogen commercial needs from a competitively advantageous position.

(3) BRIEF DESCRIPTION OF THE DRAWINGS

Having thus described the invention in general terms, reference will now be made to the accompanying drawings, which are not necessarily drawn to scale.

FIG. 1 is a perspective view of the invention.
FIG. 2 is a section view of the containment vessel.
FIG. 3 is a section view of the containment vessel.
FIG. 4A and FIG. 4B show exemplary construction of the plates.

(4) DETAILED DESCRIPTION OF THE INVENTION

Embodiment of the present invention overcome many of the obstacles associated with efficient electrolysis and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the improved steel plate alkali electrolyzer. The improved electrolyzer comprises, containment vessel 20 which is shown in more detail in FIG. 2 and FIG. 3.

The anode and cathode plates that extend outside of the containment vessel 28 are shown in FIG. 1, FIG. 2 and FIG. 3.

FIG. 1 shows the exit location of Brown's gas and warmer electrolyte 14 and the recirculation inlet where the cooler electrolyte is reintroduced into the containment vessel 16, also shown in FIG. 2.

FIG. 2 shows the insulating material that wraps the ends of the steel plates 10, also shown in FIG. 3. This insulating material is superior to gaskets as it only takes a small fraction of an inch groove to be cut to hold the precise alignment of the steel plates. Where gaskets are used it takes much more of the surface of the plates to hold the gasket, thus loosing valuable production surface area of the plates. Gaskets with time will crack, tear, or otherwise decompose with the resulting in the leaking of a highly concentrated alkali. Further for the gaskets and the end plates to keep from warping the gaskets must be compressed in their center. This greatly adds to the width of the gasket as it must have a series of holes in it to allow the bolts to be inserted. This is problematic in that the bolts must also pass through the steel plates that are electrified. It is self-evident that the older art of the steel plate alkali electrolyzers that use gaskets have serious design and efficiency obstacles. Both FIG. 2 and FIG. 3 show how the insulating material is tightly fit into the containment at several points and is slid into the containment vessel. Thus the insulating material and the steel plates cannot move or lose their precise alignment even given the vibrations of on-board position on motorized vehicles. FIG. 2 and FIG. 3 show the extra space 18 in the containment vessel that holds extra electrolyte that helps to absorb some of the heat in the electrolyzer and also is used to seep around the plates and the insulating material which replenishes the warmer electrolyte in the electrolyzer as it is exiting at the top with the Brown's gas at the exit fitting 14. The warmer electrolyte is cooled outside of the containment vessel and reinserted into the containment vessel at the inlet fitting 16. This circulating process is accomplished without the use of a pump or other mechanical supports, further making this electrolyzer more efficient than is the present art.

Figure 1:
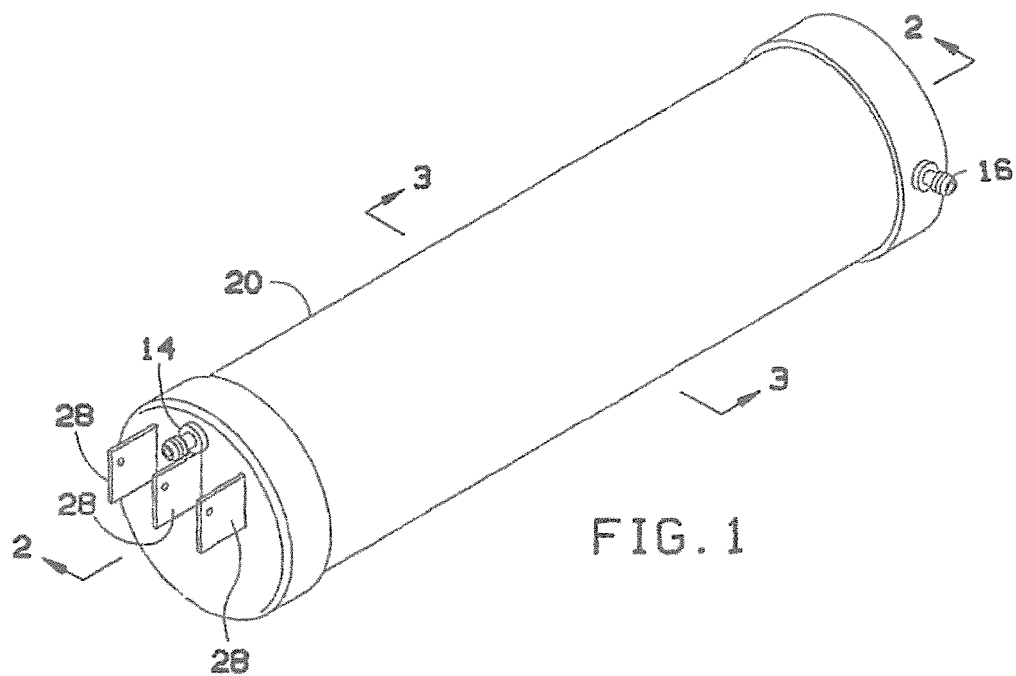
Figure 2:
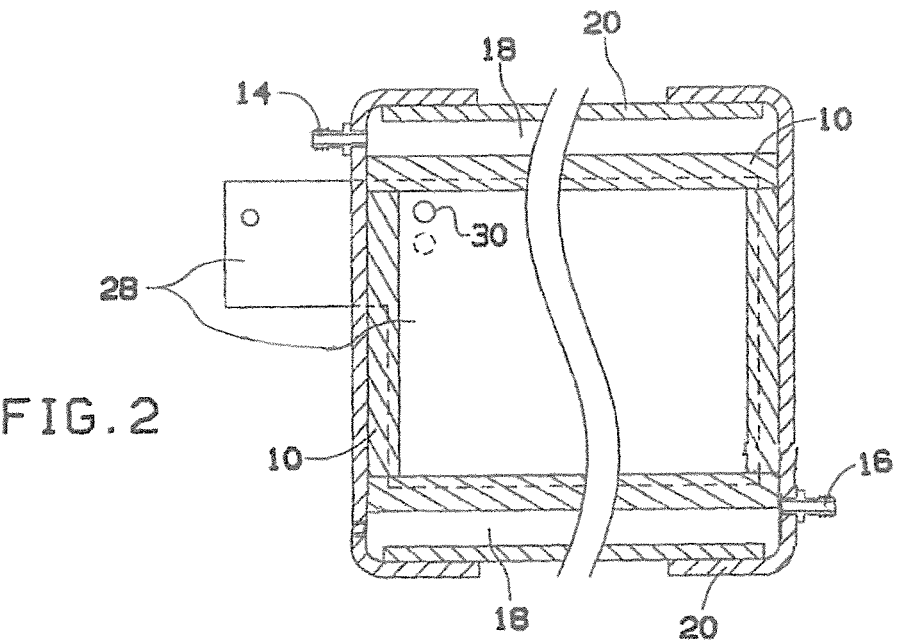
Figure 3:
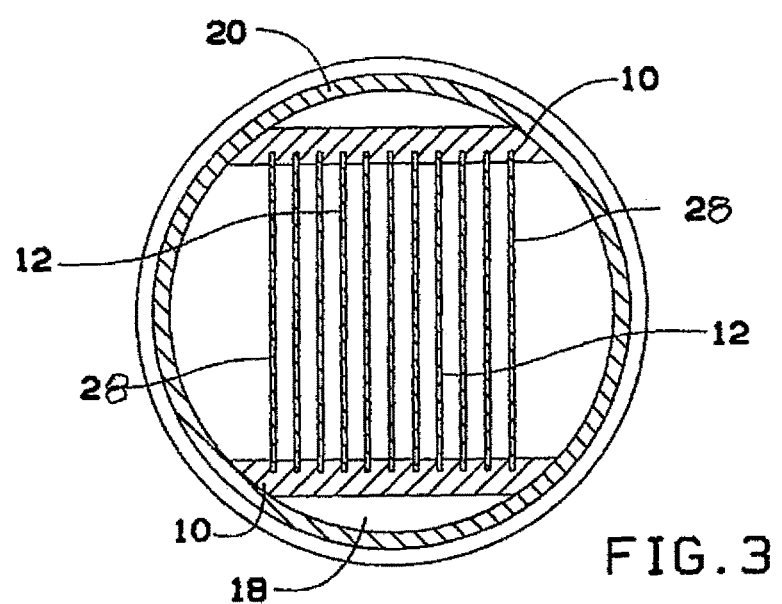
FIG. 3 shows the bi-polar plates 12 (non-anode plates and non-cathode plates, the number of which are determined by the voltage used and the formulas given), also shown in FIG. 3 and FIGS. 4A and 4B.
Figure 4A:
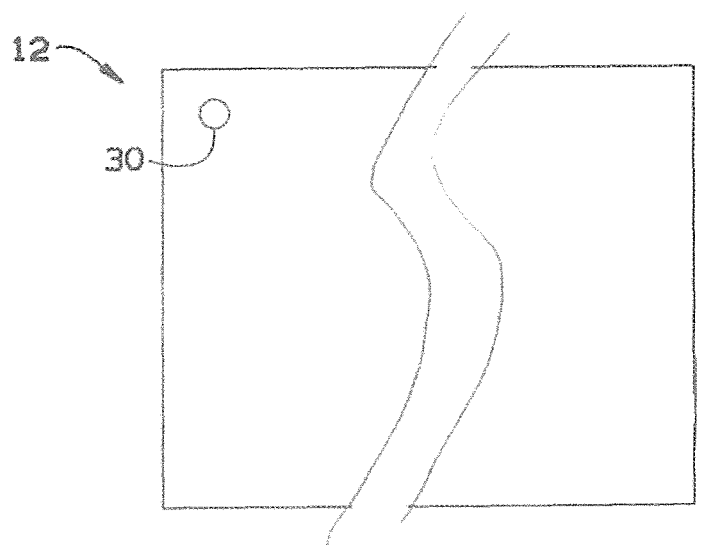
FIGS. 4A and 4B show the bi-polar plates 12 with the offset perforations 30 that are only at the top of the plates, the region of the plates that are filled with Brown's gas bubbles and is not the efficient Brown's gas production part of the plates, thus not losing efficiency in the production process.
Figure 4B:
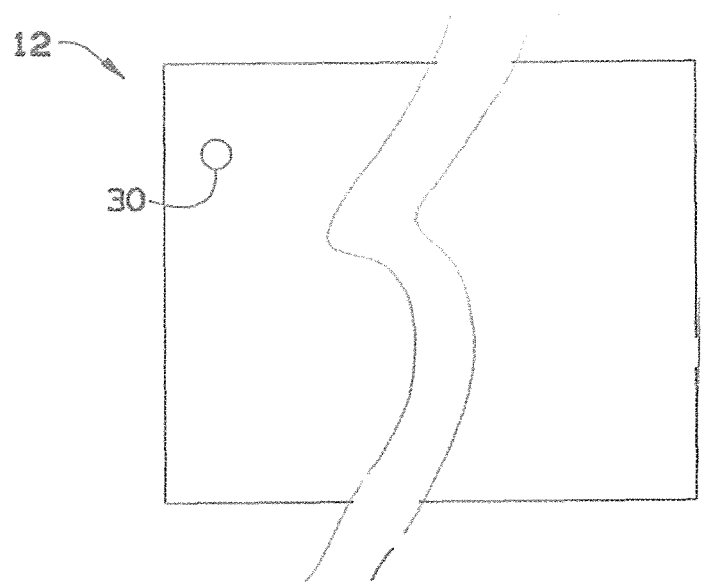

This entire patent represents an improved steel plate alkali electrolyzer that is "well suited" for the onboard production of Brown's that significantly affects both PM reduction and fuel efficiency. See Attachment, Testing of the Warner Hydrogen Steel Plate Alkali Electrolyzer completed by UC Davis, Center for Transportation Studies, Andrew Burke, PhD and Marshall Miller, PhD.

That which is claimed:

1. A steel plate alkali electrolyzer that changes liquid water into hydrogen and oxygen gas (Brown's gas) ("BG"), wherein the electrolyzer is comprised of:
   a containment vessel;
   wherein the containment vessel is filled with an aqueous solution including an electrolyte;
   multiple rectangular steel plates within the containment vessel, each plate being oriented vertically, two or more of which are electrode plates, wherein the electrode plates extend outside of the containment vessel of the electrolyzer so that electrical connections to the electrode plates are made outside of the containment vessel of the electrolyzer, no electrical connections being made on a sealed interior of the containment vessel, the multiple rectangular steel plates further comprising a number of bipolar plates which are of a shorter length than the electrode plates, such that the bipolar plates are entirely disposed within the containment vessel, and wherein the bipolar plates are not electrically connected to the electrode plates through any electrical connection, but only through the aqueous solution including the electrolyte provided in the containment vessel;
   wherein each steel plate includes an insular wrap around left and right vertical edges of each plate, as well as any top and bottom edges of each steel plate within the containment vessel so as to deny applied current any stray path around the plates, wherein the insular wrap comprises grooves cut into the insular wrap into which the steel plates are received, wherein no internal gaskets are provided around edges of the steel plates;
   wherein that portion of each steel plate positioned in the containment vessel does not include any holes formed therein, except for a single hole positioned in a top portion of each plate, holes of adjacent steel plates being offset relative to one another, so that the aqueous solution passes from a cavity between adjacent plates only through the hole in the top portion of each plate;
   wherein the rectangular steel plates have a vertical height that is from 2 to 10 times a width of each plate, and the plates are oriented vertically, with the hole of each plate positioned towards the top of each plate, such that it is warmer aqueous solution that passes through the hole of each plate, while cooler aqueous solution remains towards a bottom of each plate in the electrolyzer;
   wherein an outlet is provided at a top of the containment vessel of the electrolyzer for exiting warm aqueous solution and BG, and an inlet is provided at a bottom of the containment vessel of the electrolyzer, such that the warmer aqueous solution exits the electrolyzer, for recirculation back into the electrolyzer, through the inlet at the bottom of the electrolyzer;
   wherein the BG is generated by applying a voltage through all of the electrode plates; and
   wherein the BG is directed into an air intake apparatus of an internal combustion engine.

\* \* \* \* \*